United States Patent
de Hoog et al.

(10) Patent No.: US 11,093,599 B2
(45) Date of Patent: Aug. 17, 2021

(54) TAMPER MITIGATION SCHEME FOR LOCALLY POWERED SMART DEVICES

(71) Applicant: International Business Machines Corporation, Armonk, NY (US)

(72) Inventors: Julian de Hoog, Greensborough (AU); Timothy M. Lynar, Melbourne (AU); Khalid Abdulla, Edinburgh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 317 days.

(21) Appl. No.: 16/021,244

(22) Filed: Jun. 28, 2018

(65) Prior Publication Data
US 2020/0004950 A1   Jan. 2, 2020

(51) Int. Cl.
*G06F 21/44* (2013.01)
*G06F 21/86* (2013.01)

(52) U.S. Cl.
CPC .............. *G06F 21/44* (2013.01); *G06F 21/86* (2013.01)

(58) Field of Classification Search
CPC .................................. G06F 21/44; G06F 21/86
USPC .......................................................... 726/18
See application file for complete search history.

(56) References Cited

U.S. PATENT DOCUMENTS

| | | | |
|---|---|---|---|
| 2,117,565 A | 5/1938 | Mitchell | |
| 4,945,872 A | 8/1990 | Embry | |
| 5,485,908 A * | 1/1996 | Wang | G07D 5/00 194/317 |
| 5,641,587 A * | 6/1997 | Mitchell | H02J 7/00036 429/90 |
| 5,764,028 A * | 6/1998 | Freiman | H02J 7/00036 320/106 |
| 5,831,350 A * | 11/1998 | McConkey | G06F 1/263 307/150 |
| 5,892,900 A * | 4/1999 | Ginter | G06F 21/10 726/26 |
| 5,903,137 A * | 5/1999 | Freiman | H02J 7/00 320/163 |

(Continued)

FOREIGN PATENT DOCUMENTS

CN         104466898 A     3/2015

OTHER PUBLICATIONS

Arafin et al., "Secret Sharing and Multi-user Authentication: From Visual Cryptography to RRAM Circuits," 2016 International Great Lakes Symposium on VLSI, IEEE, 2016, pp. 169-174.

*Primary Examiner* — Michael S McNally
(74) *Attorney, Agent, or Firm* — Cantor Colburn LLP; Joseph Petrokaitis

(57) ABSTRACT

Embodiments of the invention are directed to a locally powered smart device. A non-limiting example of the locally powered smart device includes a sensor, an energy storage communicatively coupled to the sensor, a processor communicatively coupled to the sensor and the energy storage. The processor is configured to control the sensor and the energy storage to perform multiple iterations of a tamper mitigation process, wherein each of the multiple iterations of the tamper mitigation process includes an authentication process that includes the transmission of authentication communications between the sensor and the energy storage. The processor is further configured to initiate an anti-tampering protocol based at least in part on a determination that the authentication process was unsuccessful.

21 Claims, 7 Drawing Sheets

(56) References Cited

U.S. PATENT DOCUMENTS

| | | | |
|---|---|---|---|
| 5,910,987 A * | 6/1999 | Ginter | G06Q 40/02 705/52 |
| 6,459,175 B1 * | 10/2002 | Potega | G06F 1/26 307/149 |
| 6,564,998 B1 * | 5/2003 | Oross | E05B 17/147 235/380 |
| 6,580,250 B1 | 6/2003 | Stellberger et al. | |
| 7,016,516 B2 * | 3/2006 | Rhoads | G06K 19/06037 382/100 |
| 7,113,596 B2 * | 9/2006 | Rhoads | G06Q 20/341 380/54 |
| 7,124,170 B1 * | 10/2006 | Sibert | G06F 12/145 709/216 |
| 7,218,226 B2 | 5/2007 | Wehrenberg | |
| 7,307,582 B2 * | 12/2007 | Griessbaum | G01F 23/284 324/629 |
| 7,343,496 B1 * | 3/2008 | Hsiang | G06F 21/572 713/194 |
| 8,106,768 B2 * | 1/2012 | Neumann | G01D 21/00 340/539.26 |
| 8,351,408 B2 * | 1/2013 | Daigle | H04W 12/08 370/338 |
| 8,411,898 B2 * | 4/2013 | Rhoads | G07D 7/0047 382/100 |
| 8,639,625 B1 * | 1/2014 | Ginter | G06F 21/51 705/51 |
| 8,707,460 B2 * | 4/2014 | Cabouli | G06Q 20/40145 726/34 |
| 8,725,330 B2 * | 5/2014 | Failing | B60L 53/30 701/22 |
| 8,812,908 B2 * | 8/2014 | Douceur | G06F 21/86 714/22 |
| 9,007,182 B2 * | 4/2015 | Cruzado | H05K 5/0208 220/4.26 |
| 9,059,189 B2 * | 6/2015 | Keller, III | G06F 21/87 |
| 9,069,946 B2 * | 6/2015 | Markel | G06F 21/44 |
| 9,094,385 B2 * | 7/2015 | Akyol | G06F 21/44 |
| 9,191,203 B2 * | 11/2015 | Rooyakkers | H04L 9/083 |
| 9,258,119 B2 * | 2/2016 | Takahashi | H04L 9/10 |
| 9,280,654 B1 * | 3/2016 | Peterson | G06F 21/81 |
| 9,305,189 B2 * | 4/2016 | Mraz | G06F 21/82 |
| 9,390,566 B2 * | 7/2016 | Taylor | B60L 3/0007 |
| 9,524,385 B1 * | 12/2016 | McKinley | G06F 21/305 |
| 9,759,757 B2 * | 9/2017 | House | G01R 29/26 |
| 9,798,294 B2 * | 10/2017 | Markel | G09F 3/03 |
| 9,843,624 B1 * | 12/2017 | Taaghol | H04L 41/0803 |
| 9,881,300 B2 * | 1/2018 | Reese | G06F 21/53 |
| 10,042,354 B2 * | 8/2018 | Chand | G06F 21/54 |
| 10,127,409 B1 * | 11/2018 | Wade | G06Q 20/30 |
| 10,235,516 B2 * | 3/2019 | Parello | H04L 25/02 |
| 10,361,163 B2 * | 7/2019 | Lee | H01L 23/576 |
| 10,534,937 B2 * | 1/2020 | Rooyakkers | G06F 21/85 |
| 10,572,695 B1 * | 2/2020 | Guise | G06F 21/86 |
| 10,579,833 B1 * | 3/2020 | Cook | G06F 21/88 |
| 10,613,567 B2 * | 4/2020 | Rooyakkers | G06F 21/44 |
| 10,621,381 B2 * | 4/2020 | Sofia | G06F 21/64 |
| 2002/0048369 A1 * | 4/2002 | Ginter | G07F 9/026 380/277 |
| 2002/0095594 A1 * | 7/2002 | Dellmo | G06F 21/86 726/26 |
| 2002/0147924 A1 * | 10/2002 | Flyntz | G06F 21/32 726/4 |
| 2003/0191719 A1 * | 10/2003 | Ginter | G06F 21/10 705/54 |
| 2004/0054630 A1 * | 3/2004 | Ginter | H04N 21/443 705/53 |
| 2004/0133793 A1 * | 7/2004 | Ginter | H04N 21/235 713/193 |
| 2005/0039040 A1 * | 2/2005 | Ransom | G01R 22/066 726/6 |
| 2005/0127867 A1 * | 6/2005 | Calhoon | G06F 1/26 320/108 |
| 2005/0127868 A1 * | 6/2005 | Calhoon | H02J 7/00045 320/108 |
| 2005/0177716 A1 * | 8/2005 | Ginter | G06F 21/10 713/157 |
| 2005/0216751 A1 * | 9/2005 | Dellmo | G06F 21/85 713/189 |
| 2005/0231365 A1 * | 10/2005 | Tester | G06K 19/07798 340/568.1 |
| 2006/0005055 A1 * | 1/2006 | Potega | G06F 1/3203 713/300 |
| 2007/0123303 A1 * | 5/2007 | Book | H04W 52/0277 455/557 |
| 2007/0123304 A1 * | 5/2007 | Pattenden | H04M 1/0262 455/557 |
| 2007/0123316 A1 * | 5/2007 | Little | H04L 9/3271 455/573 |
| 2007/0165345 A1 * | 7/2007 | Woo | H04L 12/10 361/56 |
| 2007/0266447 A1 * | 11/2007 | Hollander | G06F 21/32 726/34 |
| 2008/0028168 A1 * | 1/2008 | Muraoka | G06F 21/86 711/159 |
| 2008/0028247 A1 * | 1/2008 | Muraoka | G06F 21/86 713/340 |
| 2009/0077675 A1 * | 3/2009 | Cabouli | G07F 7/0866 726/34 |
| 2009/0096413 A1 * | 4/2009 | Partovi | H02J 7/045 320/108 |
| 2009/0313473 A1 * | 12/2009 | Walker | G06F 21/86 713/175 |
| 2010/0046553 A1 * | 2/2010 | Daigle | G06F 21/44 370/474 |
| 2011/0031985 A1 * | 2/2011 | Johnson | G08B 13/1418 324/681 |
| 2011/0078092 A1 * | 3/2011 | Kim | B60L 50/66 705/412 |
| 2011/0183733 A1 * | 7/2011 | Yoshida | A63F 13/65 463/1 |
| 2011/0184575 A1 * | 7/2011 | Kawamoto | G06T 1/0028 700/292 |
| 2011/0184580 A1 * | 7/2011 | Kawamoto | B60L 53/665 700/295 |
| 2011/0184585 A1 * | 7/2011 | Matsuda | H02J 13/00002 700/297 |
| 2011/0184586 A1 * | 7/2011 | Asano | G05B 15/02 700/297 |
| 2011/0208637 A1 * | 8/2011 | Wakita | G06Q 40/04 705/37 |
| 2011/0244798 A1 * | 10/2011 | Daigle | G06Q 30/0645 455/41.2 |
| 2011/0252248 A1 * | 10/2011 | Cameron | G06Q 10/04 713/300 |
| 2011/0259953 A1 * | 10/2011 | Baarman | G01F 23/20 235/375 |
| 2012/0030768 A1 * | 2/2012 | Mraz | G06F 21/85 726/26 |
| 2012/0072771 A1 * | 3/2012 | Douceur | G06F 11/1441 714/22 |
| 2012/0223403 A1 * | 9/2012 | Keller, III | G06F 21/44 257/428 |
| 2012/0249082 A1 * | 10/2012 | Yamamoto | H02J 7/0077 320/152 |
| 2012/0286723 A1 * | 11/2012 | Ukita | H02J 13/0062 320/107 |
| 2013/0007458 A1 * | 1/2013 | Wakita | H04L 63/0823 713/175 |
| 2013/0026973 A1 * | 1/2013 | Luke | B60L 1/14 320/106 |
| 2013/0030608 A1 * | 1/2013 | Taylor | G06F 3/0608 701/2 |
| 2013/0036311 A1 * | 2/2013 | Akyol | G06F 21/44 713/189 |
| 2013/0047209 A1 * | 2/2013 | Satoh | G09C 1/00 726/2 |
| 2013/0097415 A1 * | 4/2013 | Li | G06F 9/4893 713/100 |

(56) References Cited

U.S. PATENT DOCUMENTS

| | | | | |
|---|---|---|---|---|
| 2013/0097443 A1* | 4/2013 | Li | G06F 1/3296 | 713/322 |
| 2013/0141137 A1* | 6/2013 | Krutzik | G09C 1/00 | 326/8 |
| 2013/0151860 A1* | 6/2013 | Walker | G06F 21/725 | 713/186 |
| 2013/0158936 A1* | 6/2013 | Rich | G01R 22/066 | 702/130 |
| 2013/0160083 A1* | 6/2013 | Schrix | H04L 9/3271 | 726/3 |
| 2013/0176104 A1* | 7/2013 | Rich | H04W 12/06 | 340/5.8 |
| 2013/0211551 A1* | 8/2013 | Ricket | G06Q 20/145 | 700/19 |
| 2014/0082720 A1* | 3/2014 | Markel | G06F 21/44 | 726/16 |
| 2014/0082721 A1* | 3/2014 | Hershman | G06F 21/44 | 726/16 |
| 2014/0123327 A1* | 5/2014 | Takahashi | H05K 1/0268 | 726/34 |
| 2014/0136874 A1* | 5/2014 | Diab | G06F 1/28 | 713/340 |
| 2014/0158389 A1 | 6/2014 | Ito et al. | | |
| 2014/0289820 A1* | 9/2014 | Lindemann | G06Q 20/40145 | 726/5 |
| 2014/0289833 A1* | 9/2014 | Briceno | H04L 63/08 | 726/7 |
| 2014/0337642 A1* | 11/2014 | Takahashi | G06F 21/78 | 713/194 |
| 2014/0365026 A1* | 12/2014 | Komano | H04L 9/0891 | 700/297 |
| 2015/0022272 A1* | 1/2015 | Felix | G06F 1/324 | 331/17 |
| 2015/0022321 A1* | 1/2015 | Lefevre | G06K 19/07345 | 340/10.1 |
| 2015/0048684 A1* | 2/2015 | Rooyakkers | G09C 1/00 | 307/65 |
| 2015/0143142 A1* | 5/2015 | Park | G06F 1/206 | 713/320 |
| 2015/0364937 A1* | 12/2015 | Becerra | H02J 7/0085 | 320/101 |
| 2016/0047861 A1* | 2/2016 | Chen | G01R 31/382 | 361/78 |
| 2016/0050203 A1* | 2/2016 | Hefetz | G06Q 20/4016 | 726/7 |
| 2016/0145903 A1* | 5/2016 | Taylor | B60L 7/14 | 701/2 |
| 2016/0163167 A1 | 6/2016 | Fawcett et al. | | |
| 2016/0224048 A1* | 8/2016 | Rooyakkers | H02J 7/34 | |
| 2016/0225104 A1* | 8/2016 | Yamaguchi | G06Q 20/145 | |
| 2016/0232736 A1* | 8/2016 | Holtappels | H01M 10/4257 | |
| 2016/0248481 A1 | 8/2016 | Richter et al. | | |
| 2016/0282394 A1* | 9/2016 | House | G06K 9/00577 | |
| 2016/0283937 A1* | 9/2016 | Reese | G06F 21/602 | |
| 2016/0294206 A1* | 10/2016 | Okawa | H02J 7/00036 | |
| 2016/0300187 A1* | 10/2016 | Kashi | G06Q 10/0832 | |
| 2016/0314294 A1* | 10/2016 | Kubler | H04L 63/0853 | |
| 2017/0005515 A1* | 1/2017 | Sanders | H02J 3/381 | |
| 2017/0034701 A1* | 2/2017 | Miyamoto | H04W 4/70 | |
| 2017/0039309 A1* | 2/2017 | Wang | G06F 30/394 | |
| 2017/0085539 A1* | 3/2017 | Wishard | H04L 63/0442 | |
| 2017/0094538 A1* | 3/2017 | Cui | G06F 21/64 | |
| 2017/0181401 A1* | 6/2017 | Lefevre | G01S 19/14 | |
| 2017/0193839 A1* | 7/2017 | Breed | G06K 9/0061 | |
| 2017/0219234 A1 | 8/2017 | Bhide | | |
| 2017/0245027 A1* | 8/2017 | Smith | G06F 21/44 | |
| 2017/0257762 A1* | 9/2017 | Ginzboorg | G06F 21/44 | |
| 2017/0262660 A1* | 9/2017 | Dede | G06F 21/73 | |
| 2017/0277888 A1* | 9/2017 | Robinson | G06F 21/88 | |
| 2017/0279170 A1* | 9/2017 | O'Hora | H01M 10/486 | |
| 2017/0331803 A1* | 11/2017 | Parello | G06F 21/44 | |
| 2018/0026454 A1* | 1/2018 | Belkacem-Boussaid | H02J 7/0019 | 702/63 |
| 2018/0039990 A1* | 2/2018 | Lindemann | G06F 21/31 | |
| 2018/0041503 A1* | 2/2018 | Lindemann | H04L 9/0825 | |
| 2018/0089416 A1* | 3/2018 | Rooyakkers | H04L 9/083 | |
| 2018/0091550 A1* | 3/2018 | Cho | H04L 63/1466 | |
| 2018/0101675 A1* | 4/2018 | Kubler | H04L 63/0853 | |
| 2018/0120829 A1* | 5/2018 | Price | B64C 27/20 | |
| 2018/0191501 A1* | 7/2018 | Lindemann | G06F 3/0683 | |
| 2018/0191695 A1* | 7/2018 | Lindemann | H04L 63/0853 | |
| 2018/0313877 A1* | 11/2018 | Brant | H01Q 1/36 | |
| 2019/0026457 A1* | 1/2019 | Plusquellic | G06F 21/70 | |
| 2019/0164156 A1* | 5/2019 | Lindemann | H04L 9/0825 | |
| 2019/0180151 A1* | 6/2019 | Fryshman | A01M 5/04 | |
| 2019/0190920 A1* | 6/2019 | Connell, II | H04W 12/0605 | |
| 2019/0222424 A1* | 7/2019 | Lindemann | H04L 9/0861 | |
| 2019/0286805 A1* | 9/2019 | Law | G06F 21/34 | |
| 2019/0296564 A1* | 9/2019 | Bokil | H01M 2/1077 | |
| 2019/0306165 A1* | 10/2019 | Kawamura | H04L 9/32 | |
| 2019/0307000 A1* | 10/2019 | Sion | G06F 1/182 | |
| 2019/0362080 A1* | 11/2019 | Achillopoulos | G06F 21/88 | |
| 2019/0386836 A1* | 12/2019 | Gong | H04L 12/10 | |

* cited by examiner

TAMPER MITIGATION SCHEME FOR LOCALLY POWERED SMART DEVICES

BACKGROUND

The present invention relates in general to computer-based control systems. More specifically, the present invention relates to systems, computer-implemented methods, and computer program products for providing tamper mitigation schemes for locally powered smart devices.

Small or miniaturized mobile computing systems, such as miniaturized computers, input devices, sensors, detectors, image displays, wireless communication devices, and the like can be integrated into almost any object to provide mobile and lightweight solutions to communicating and interacting with the objects in an environment. For example, in a home environment, such small mobile computing systems can be integrated into household objects such as shoes, clothing, appliances, televisions, garage door openers, alarm systems, indoor or outdoor lighting systems, and the like. The phrase "Internet of Things" (IoT) was coined to describe networked small computing systems of the type described above, including systems that provide some or all of their connectivity through the internet.

SUMMARY

Embodiments of the invention are directed to a locally powered smart device. A non-limiting example of the locally powered smart device includes a sensor, an energy storage communicatively coupled to the sensor, and a processor communicatively coupled to the sensor and the energy storage. The processor is configured to control the sensor and the energy storage to perform multiple iterations of a tamper mitigation process, wherein each of the multiple iterations of the tamper mitigation process includes an authentication process that includes the transmission of authentication communications between the sensor and the energy storage. The processor is further configured to initiate an anti-tampering protocol based at least in part on a determination that the authentication process was unsuccessful.

Embodiments of the invention are also directed to computer-implemented methods and computer program products having substantially the same features as the above-described locally powered smart device.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

Figure 1:
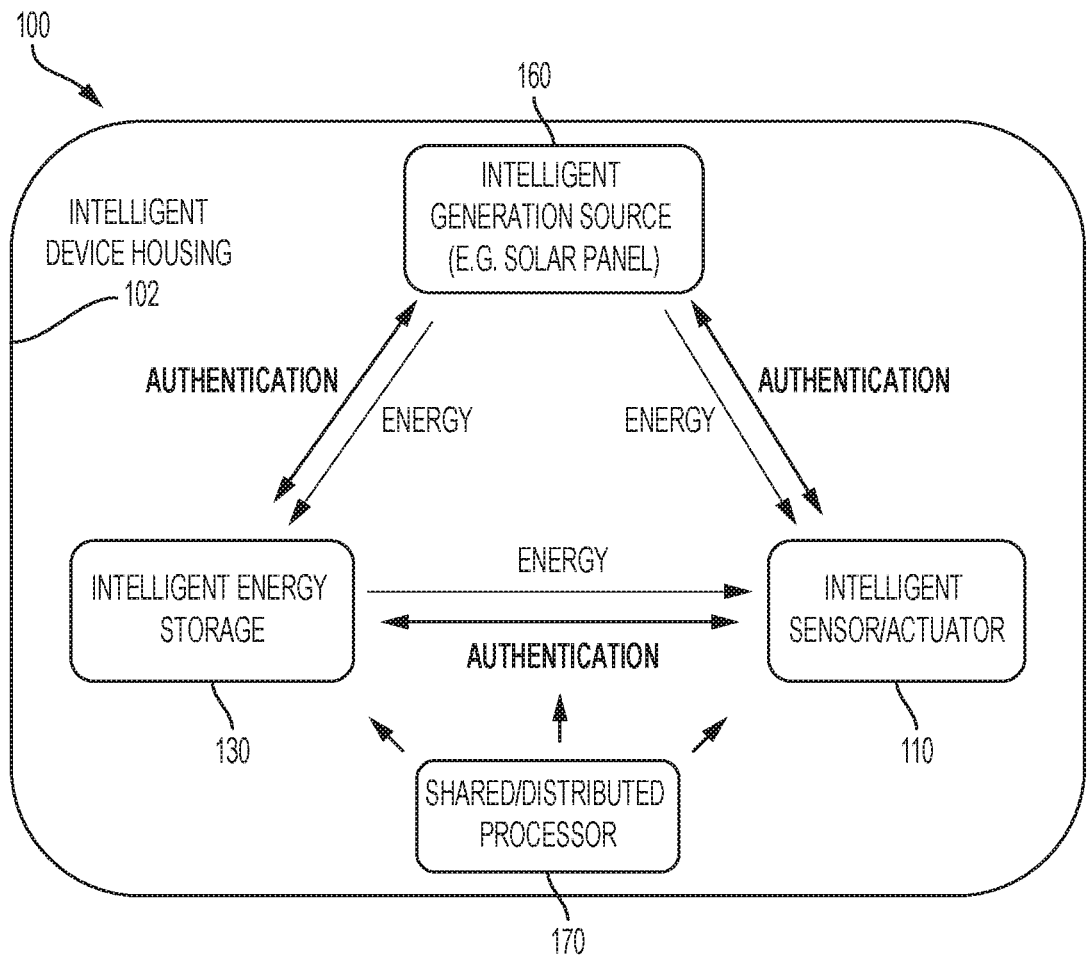
FIG. 1 is a block diagram illustrating a sensor system configured to incorporate a tamper mitigation scheme in accordance with embodiments of the invention.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the present invention, the adjectives "smart" and/or "connected" are often used to describe the use of computer-based, networked technologies to augment the features of a product or system. Smart/connected products are embedded with small mobile computing processors, sensors, software and connectivity that allow data about the product to be gathered, processed and transmitted to external systems. The data collected from smart/connected products can be analyzed and used to inform decision-making and enable operational efficiencies of the product. The phrase "Internet of Things" (IoT) was coined to describe smart/connected systems of the type described above, including systems that provide some or all of their connectivity through the internet. Projections regarding the expected growth of IoT systems vary widely, but the consensus across many industry analysts is that there will be billions of IoT devices interconnected by 2020. While many IoT devices are likely to be small and low-cost, many applications require the use of smart sensors/actuators that contain, information, technology or materials that are of value, which makes smart sensors/actuators attractive targets for tampering or even theft.

Turning now to an overview of aspects of the present invention, embodiments of the invention provide systems, computer-implemented methods, and computer program products for providing tamper mitigation schemes for use by locally powered smart devices such as a locally powered smart sensor of a networked smart sensor/actuator system. In embodiments of the invention, the locally powered smart device includes a sensor/actuator, a battery, an optional local power generator, and a local processor. In embodiments of the invention, one local processor is shared among the sensor/actuator, the battery, and the optional local power generator. In embodiments of the invention, the sensor/actuator, the battery, and the optional local power generator are each provided with a dedicated processor, and the dedicated processors are configured and arranged to communicate with each other. Any function performed by the single/shared local processor can also be performed by one or more of the dedicated local processors, and vice versa. In embodiments of the invention, the shared processor or the dedicated processors are configured to execute the novel tamper mitigation scheme by implementing an authentication protocol between and among the sensor/actuator, the battery, and the optional local power generator. In embodiments of the invention, the sensor/actuator authenticates itself with the battery, the sensor/actuator authenticates itself with the local power generator, and the local power generator authenticates itself with the battery. In embodiments of the invention, the authentication protocol cycles through authentication exchanges according to a predetermined schedule, and the authentication requirements must be satisfied in the given cycle/iteration of the authentication protocol in order for continued functional operation of the sensor/actuator, the battery, and the optional local power generator to continue being enabled. If at any point during the functional operations of the sensor/actuator, the battery, and the optional local power generator the authentication protocol fails, the system determines that an unauthorized tampering is taking place and activates an anti-tampering or anti-theft procedure, which can include, for example, self-deactivation, self-destruction, or active destruction of other components subsequently coupled to the smart device that do not authenticate themselves.

In embodiments of the invention, the authentication protocol can be implemented using a known authentication mechanism. For example, the authentication mechanism can be digital signature techniques that generate validation data and perform validation. Digital signature techniques incorporate public-key cryptography methodologies to allow a first entity (e.g., the battery) to validate that a second entity (e.g., the sensor/actuator) is authentic. In an example digital signature technique/configuration, the first entity or "signer" hashes data and encrypts the hash with the signer's private key. The encrypted hash is the signature. The second entity can hash the same data, and then use the public key to decrypt the signature and obtain the signer's hash. The second entity can compare the second entity's hash with the first entity's hash. When the two hash values match, the data content and source(s) are verified.

In embodiments of the invention, the authentication protocol can be implemented in a manner does not require dedicated authentication communication between the smart device components. In such embodiments of the invention, the authentication communications are modulated into the energy that is drawn by the sensor/actuator from the battery and/or the local generator. In embodiments of the invention, the energy load drawn from the battery or the local power generator is modulated according to one or more specific patterns, which are identified herein as an "energy signature." In embodiments of the invention, a first authenticating entity (e.g., the sensor/actuator) draws energy in a pattern from a second authenticating entity (e.g., the battery) that matches an energy signature that is known to the first and second authenticating entities. The first and second authenticating entities are synchronized such that the first authenticating entity generates an energy signature at predetermined periodic times, and the second authenticating entity looks for the energy signature at those predetermined periodic times. If the energy signature the second authenticating entity receives matches the energy signature the second authenticating entity expects to receive, the authentication is successful. If the energy signature the second authenticating entity receives does not matches the energy signature the second authenticating entity expects to receive, the authentication is not successful. In embodiments of the invention, the second authenticating entity can repeat an unsuccessful authentication more than once for confirmation. If at any point during the functional operations of the first authenticating entity (e.g., the sensor/actuator) and the second authenticating entity (e.g., the battery) an iteration of the required energy signature match is unsuccessful, the system determines that an unauthorized tampering is taking place and activates an anti-tampering or anti-theft procedure, which can include, for example, self-deactivation, self-destruction, or active destruction of other components subsequently coupled to the smart device that do not authenticate themselves.

In embodiments of the invention, the energy signature can be generated by coupling an energy signature circuit to the sensor/actuator. In embodiments of the invention, the energy signature circuit includes a set of loads coupled through switches that can be switched on and off under computer control according to specific patterns. In embodiments of the invention, the set of loads include resistive loads, inductive loads, and capacitive loads. In embodiments of the invention that utilize direct current, the switches would modulate the energy load drawn using only the resistive loads. In embodiments of the invention that utilize alternating current, the switches would modulate the energy load drawn using the capacitive and inductive loads. These loads can be in any configuration having both series and parallel elements. Accordingly, the energy signature can be generated by issuing a set of control commands to open and close the switches in discrete time intervals over a predetermined time horizon. In embodiments of the invention, the energy signature can be generated in a rolling (or hopping) manner in which the generated energy signature is always different from the previously sent energy signature.

In embodiments of the invention, the energy signature can be based on a known operating pattern of the sensor/actuator when the sensor/actuator has a highly predictable, periodic load profile. For example, a time-lapse camera can use exactly the same amount of energy to charge a flash, capture a digital image, store the digital image in memory, and shut down again. In this case, the battery and/or the local generator can be trained and synchronized to know and recognize what kind of load pattern to expect from a given sensor/actuator over selected time intervals.

In embodiments of the invention, the energy signature can be generated by providing an energy signature compute task configured to utilize the dynamic voltage frequency scaling (DVFS) functionality of the shared local processor (or the dedicated/distributed local processors) to perform DVFS load managing tasks in a manner that generates a recognizable energy (or load) pattern that can be used as the energy signature. In its conventional use, DVFS is the adjustment of power and speed settings on a computing device's various processors, controller chips and peripheral devices to optimize resource allotment for tasks and maximize power saving when those resources are not needed. In embodiments of the invention, the DVFS functionality is modified by providing an energy signature compute task configured to control the DVFS to apply dynamic voltage scaling and/or dynamic frequency scaling to the various processors, controller chips and peripheral devices of the local shared processor in a manner that generates the energy signature. Typically, the DVFS-generated energy signature will be generated when the relevant component of the locally powered smart device is performing one of its existing computational tasks. For example, where the local generator is a solar panel, the solar panel may need to repeatedly compute the optimal voltage to enable maximum power generation ("maximum power point tracking"). As another example, the battery may repeatedly keep track of its state of charge by measuring its voltage and comparing to historical maximum and minimum readings. As another example, the sensor/actuator may need to repeatedly calculate the optimal orientation of the sensor in response to historical sensor readings. Even in situations where no ongoing computation is conducted, a synthetic computational task (such as solving a mathematical problem) can be implemented. All of these computations lead to a demand for energy. In embodiments of the invention, while the computational task is being solved, an energy signature compute task that uses DVFS can be implemented to generate a recognizable energy/load signature.

In embodiments of the invention in which the authentication is between the local power generator and the battery, the method for generating an energy signature can be tailored based at least in part on the type of generation source. For example, in embodiments of the invention, the local power generator can be a dispatchable energy generator that dispatches its energy at the request of its load (e.g., the battery or the sensor/actuator) according to power needs. Thus, dispatchable generators can be turned on or off, or can adjust their power output accordingly in response to commands. In embodiments of the invention, the energy signature is generated by configuring the shared processor or the distributed processor to issue a set of commands to the dispatchable generation source to periodically generate a specific generation pattern that can be recognized by the battery. In a non-dispatchable generation source (such as a solar panel), a specific generation pattern can be generated by adjusting component voltage using the shared processor or the distributed processor. In embodiments of the invention, the shared processor or the distributed processor can be configured to provide an authentication schedule for which no energy signature is required during certain predetermined times, for example, overnight when a solar power local generator is not receiving any light.

Turning now to a more detailed description of embodiments of the invention, FIG. 1 is a block diagram of a locally powered smart device 100 configured and arranged to implement a tamper mitigation scheme in accordance with embodiments of the invention. The locally powered smart device 100 includes an intelligent device housing 102 that houses an intelligent sensor/actuator 110, an optional intelligent generation source 160, an intelligent energy storage 130, and a shared/distributed processor 170, configured and arranged as shown. In embodiments of the invention, the intelligent energy source 160 can be a solar panel, the intelligent energy storage 130 can be a battery, the intelligent sensor/actuator 110 can be an IoT sensor/actuator, and the shared/distributed processor 170 can be a shared/distributed small mobile computing system (e.g., the computing system 700 shown in FIG. 7). In embodiments of the invention, the optional generation source 160 can be external to the housing 102, and the energy/power generated by the generation source 160 can be provided to the energy storage 130 and/or the sensor/actuator 110 in a wired or wireless configuration. In the wireless configuration, the energy storage 130 and the sensor/actuator 110 are provided with sufficient circuitry to receive wireless power transmissions and cover them to useful power for the receiving device. In embodiments of the invention, the shared/distributed processor 170 is shared among the intelligent sensor/actuator 110, the intelligent energy storage 130, and the intelligent generation source 160. In embodiments of the invention, the intelligent sensor/actuator 110, the intelligent energy storage 130, and the intelligent generation source 160 each has a dedicated processor (e.g., local processor 118 shown in FIG. 2; protection & control IC 134 shown in FIG. 4; and PV array MPPT (maximum power point tracking) controller 164 shown in FIG. 5), and the dedicated processors are configured and arranged to communicate with each other. Any operations performed by the shared/distributed processor 170 can also be performed by one or more of the dedicated processors (e.g., local processor 118, protection & control IC 134, and PV array MPPT controller 164). Similarly, any operations performed by one or more of the dedicated processors (e.g., local processor 118, protection & control IC 134, and PV array MPPT controller 164) can also be performed by the shared/distributed processor 170.

In operation, the intelligent sensor/actuator 110 receives energy for its operation from the intelligent energy storage 130 and/or the intelligent generation source 160, and the intelligent generation source 160 provides energy to the intelligent energy storage 130. In order to receive energy from the intelligent energy storage 130 or the intelligent energy generation 160, the intelligent energy source 160, the intelligent energy storage 130, and the intelligent sensor/actuator 110 must periodically complete a tamper mitigation scheme (e.g., tamper mitigation method 600 shown in FIG. 6) in accordance with aspects of the invention. In embodiments of the invention, the shared/distributed processor 170 provides primary control of the tamper mitigation scheme by implementing an authentication protocol between and among the sensor/actuator 110, the energy storage 130, and the generation source 160. In embodiments of the invention, the sensor/actuator 110 authenticates itself with the energy storage 130, the sensor/actuator 110 authenticates itself with the generation source 160, and the generation source 160 authenticates itself with the energy storage 130. In embodiments of the invention, the authentication protocol cycles through authentication exchanges according to a predetermined schedule, and the authentication requirements must be satisfied in every cycle/iteration of the authentication protocol in order for continued functional operation of the sensor/actuator 110, the energy storage 130, and the generation source 160 to be allowed. If at any point during the functional operations of the sensor/actuator 110, the energy storage 130, and the generation source 160 the authentication fails, the system (e.g., the shared/distributed processor 170) determines that an unauthorized tampering is taking place and activates an anti-theft procedure, which can include, for example, self-deactivation, self-destruction, or active destruction of other components subsequently coupled to the locally powered smart device 100 that do not authenticate themselves.

Figure 6:
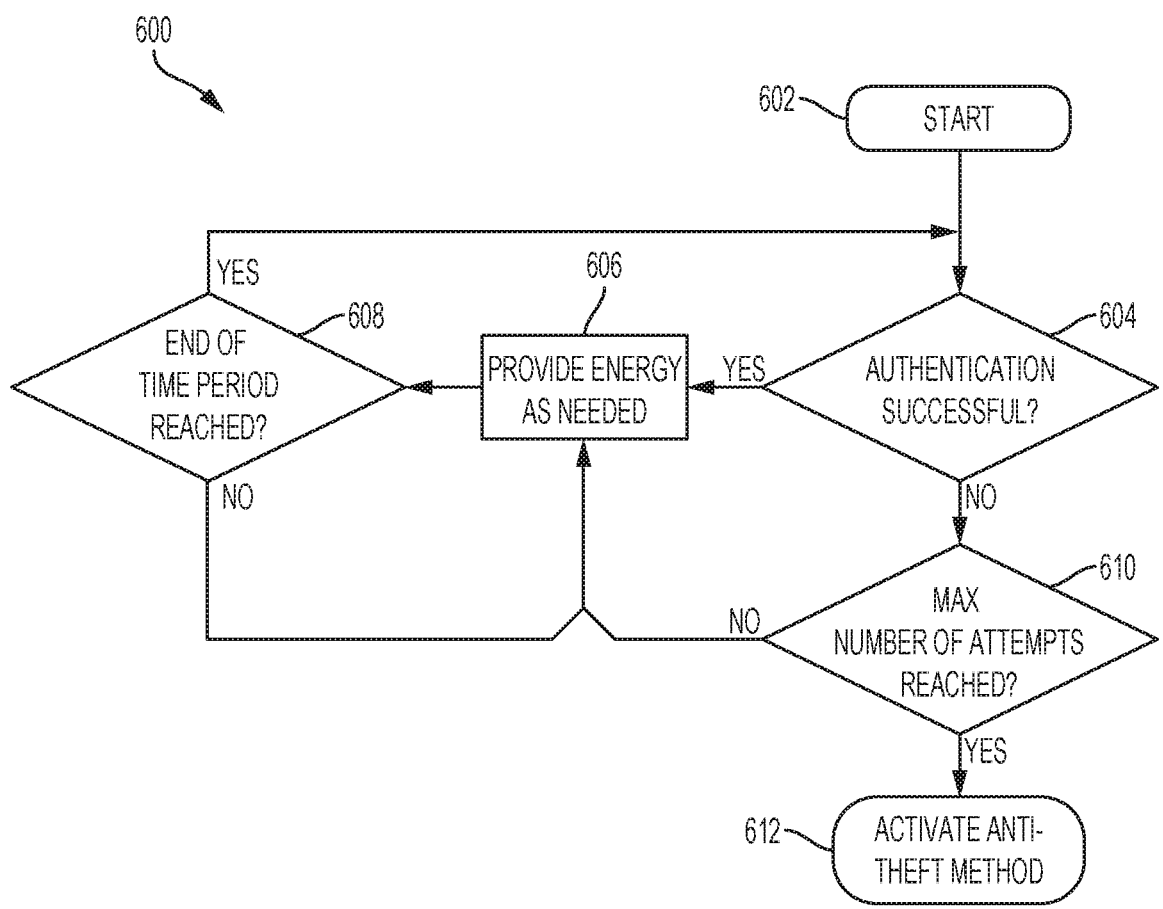
FIG. 6 is a flow diagram illustrating a method in accordance with embodiments of the invention.

In embodiments of the invention, the tamper mitigation scheme performed by the shared/distributed processor 170 (shown in FIG. 1) can be implemented as the tamper mitigation method 600 shown in FIG. 6. The method 600 begins at block 602. In embodiments of the invention, block 602 can be an authorized initiation of the method 600, which will enable the method 600 to begin and continue to cycle until an authorized termination is applied to the method 600. The authorized initiation can be performed by a master computing system (e.g., an offline server) (not shown) that initiates (or authorizes the initiation of) the method 600 when the locally powered smart device 100 (shown in FIG. 1) is installed in its associated application (e.g., an IoT system have a network of IoT sensor/actuator devices). Similarly, the authorized termination can be performed by the master computing system to terminate (or authorize the termination of) the method 600 when the locally powered smart device 100 is removed from its associated application (e.g., an IoT system have a network of IoT sensor/actuator devices). At decision block 604, the processor 170 performs an authentication and determines whether the authentication was successful. If the answer to the inquiry at decision block 604 is yes, the processor 170 does not interrupt energy transmissions, and the method 600 moves to block 606 where the locally powered smart device 100 (shown in FIG. 1) is allowed to provide its local energy as needed.

After block 606, the method 600 moves to decision block 608 where the processor 170 checks to determine whether a predetermined time has passed since the last authentication. If the answer to the inquiry at decision block 608 is no, the method 600 returns to block 606. If the answer to the inquiry at decision block 608 is yes, the method 600 returns to decision block 604. processor 170 does not interrupt energy transmissions, and the method 600 moves to block 606 where the components of the locally powered smart device 100 (shown in FIG. 1) is allowed to provide its local energy as needed.

Returning to decision block 604, if the answer to the inquiry at decision block 604 is no, the method 600 moves to decision block 610 where the processor 170 determines a predetermined maximum number of authentication attempts has been reached. To allow for communication errors, the method 600 can allow more than one unsuccessful authentication. If the answer to the inquiry at decision block 610 is no, the method 600 moves to block 606. If the answer to the inquiry at decision block 610 is yes, the method 600 moves to block 612 where the processor activates an anti-tampering (or anti-theft) method, which can include, for example, self-deactivation, self-destruction, or active destruction of other components subsequently coupled to the smart device that do not authenticate themselves.

In embodiments of the invention, the authentication at block 604 can be implemented using a known authentication mechanism. For example, the authentication mechanism can be digital signature techniques that generate validation data and perform validation. Digital signature techniques incorporate public-key cryptography methodologies to allow a first entity (e.g., the energy storage 130 (shown in FIG. 1)) to validate that a second entity (e.g., the sensor/actuator 110 (shown in FIG. 1)) is authentic. In an example digital signature technique/configuration, the first entity or "signer" (e.g., the sensor/actuator 110) hashes data and encrypts the hash with the signer's private key. The encrypted hash is the signature. The second entity (e.g., the energy storage 130) can hash the same data, and then use the public key to decrypt the signature and obtain the signer's hash. The second entity can compare the second entity's hash with the first entity's hash. When the two hash values match, the data content and source(s) are verified.

In embodiments of the invention, the authentication at block 604 can be implemented in a manner does not require dedicated authentication communication between the components of the locally powered smart device 100 (shown in FIG. 1). In such embodiments of the invention, the authentication communications are modulated into the energy that is drawn by the sensor/actuator 110 from the energy storage 130 and/or the generation source 160. In embodiments of the invention, the energy load drawn from the energy storage 130 or the generation source 160 is modulated according to one or more specific patterns, which are identified herein as an "energy signature." In embodiments of the invention, the energy signature can be generated in a rolling (or hopping) manner in which the generated energy signature is always different from the previously sent energy signature.

Figure 3:
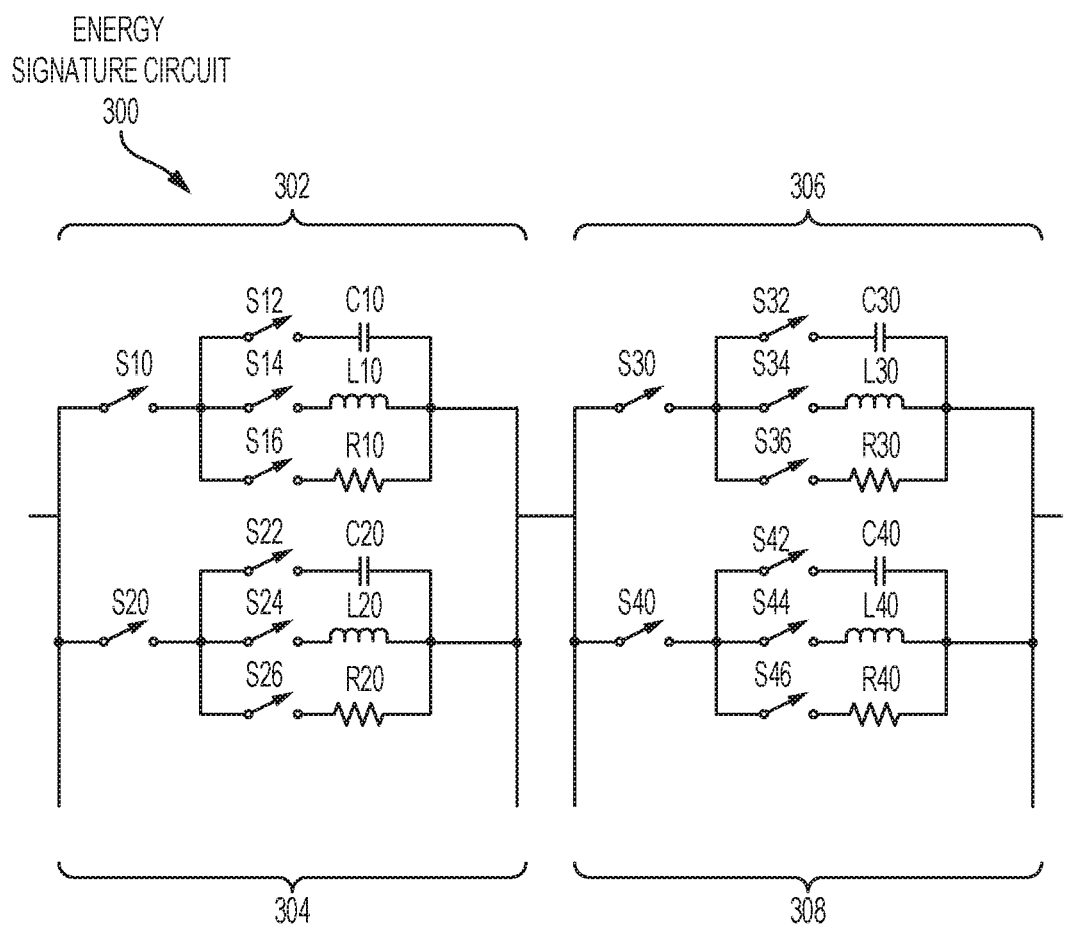
FIG. 3 is a schematic diagram illustrating an energy signature circuit configured to implement a tamper mitigation scheme in accordance with embodiments of the invention.

In embodiments of the invention, the energy signature is generated by coupling to the sensor/actuator 110 (show in FIG. 1) to an energy signature circuit 300 (shown in FIG. 3). Referring briefly to FIG. 3, in embodiments of the invention, the energy signature circuit 300 includes sub-circuits 302, 304, 306. Energy signature sub-circuit 302 includes a switch S10 coupled through parallel switches S12, S14, S16 to a set of loads C10, L10, R10, configured and arranged as shown. Energy signature sub-circuit 304 includes a switch S20 coupled through parallel switches S22, S24, S26 to a set of loads C20, L20, R20, configured and arranged as shown. Energy signature sub-circuit 306 includes a switch S30 coupled through parallel switches S32, S34, S36 to a set of loads C30, L30, R30, configured and arranged as shown. Energy signature sub-circuit 308 includes a switch S40 coupled through parallel switches S42, S44, S46 to a set of loads C40, L40, R40, configured and arranged as shown. The loads C10, L10, R10, C20, L20, R20, C30, L30, R30, C40, L40, R40 can be switched on and off at different times and under control of the shared/distributed computer 170 according to specific patterns. In embodiments of the invention, the sets of loads C10, L10, R10, C20, L20, R20, C30, L30, R30, C40, L40, R40 include resistive loads R10, R20, R30, R40, inductive loads L10, L20, L30, L40, and capacitive loads C10, C20, C30, C40. In embodiments of the invention that utilize direct current, the switches S10, S12, S20, S22, S30, S32, S40, S42 would modulate the energy load drawn using only the resistive loads R10, R20, R30, R40. In embodiments of the invention that utilize alternating current, the switches S10, S14, S16, S20, S24, S26, S30, S34, S36, S40, S44, S46 would modulate the energy load drawn using the inductive loads L10, L20, L30, L40, and capacitive loads C10, C20, C30, C40. The loads C10, L10, R10, C20, L20, R20, C30, L30, R30, C40, L40, R40 can be in any configuration having both series and parallel elements. Accordingly, the energy signature can be generated by the shared/distributed processor 170 (shown in FIG. 1) issuing a set of control commands to open and close the switches S10, S12, S14, S16, S20, S22, S24, S26, S30, S32, S34, S36, S40, S42, S44, S46 in discrete time intervals over a predetermined time horizon.

In embodiments of the invention, the energy signature can be based on a known operating pattern of the sensor/actuator 110 (shown in FIG. 1) when the sensor/actuator 110 has a highly predictable, periodic load profile. For example, the sensor/actuator 110 can be implemented to include a time-lapse camera that uses exactly the same amount of energy to charge a flash, capture a digital image, store the digital image in memory, and shut down again. In this case, the energy storage 130 and/or the generation source 160 can be trained (through the shared/distributed processor 170) to know and recognize what kind of load pattern to expect from a given sensor/actuator 110 over selected time intervals.

Figure 2:
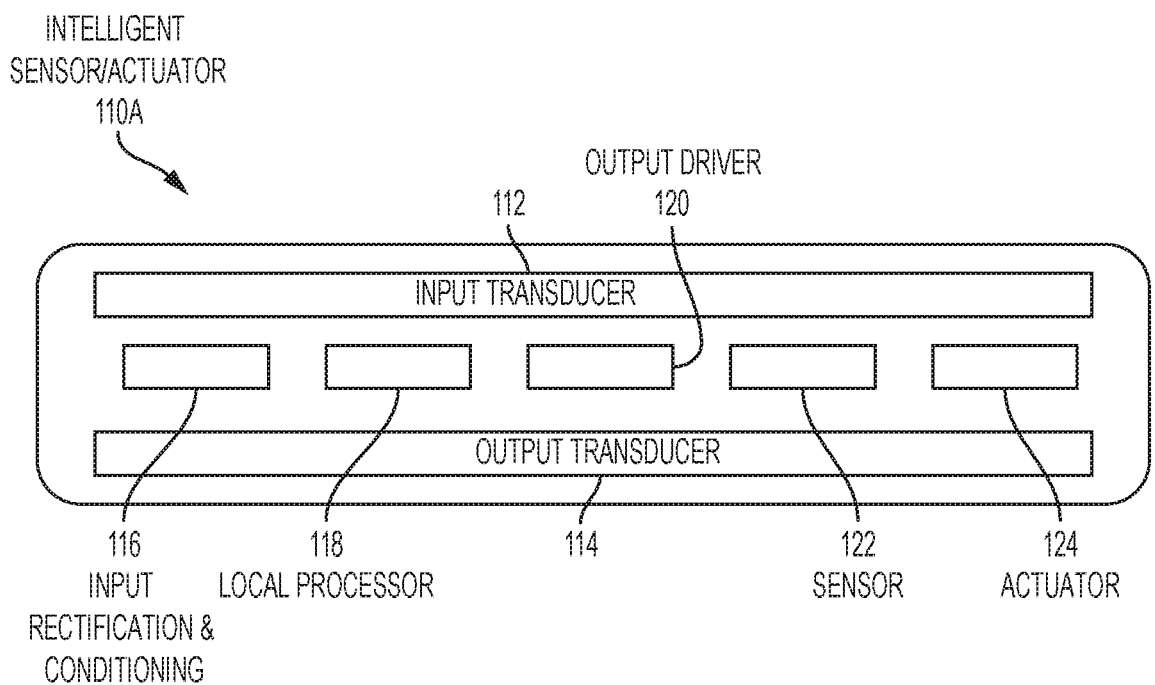
FIG. 2 is a block diagram illustrating a sensor/actuator of the sensor system in accordance with embodiments of the invention.
Figure 4:
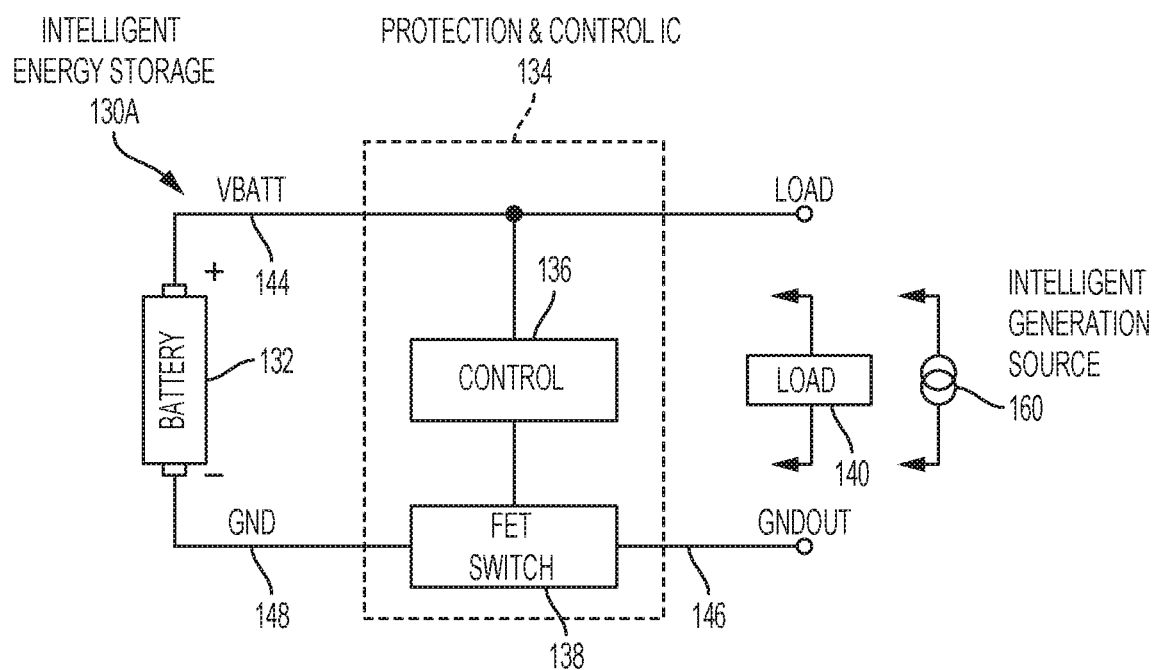
FIG. 4 is a block diagram illustrating an energy storage system of the sensor system in accordance with embodiments of the invention.
Figure 5:
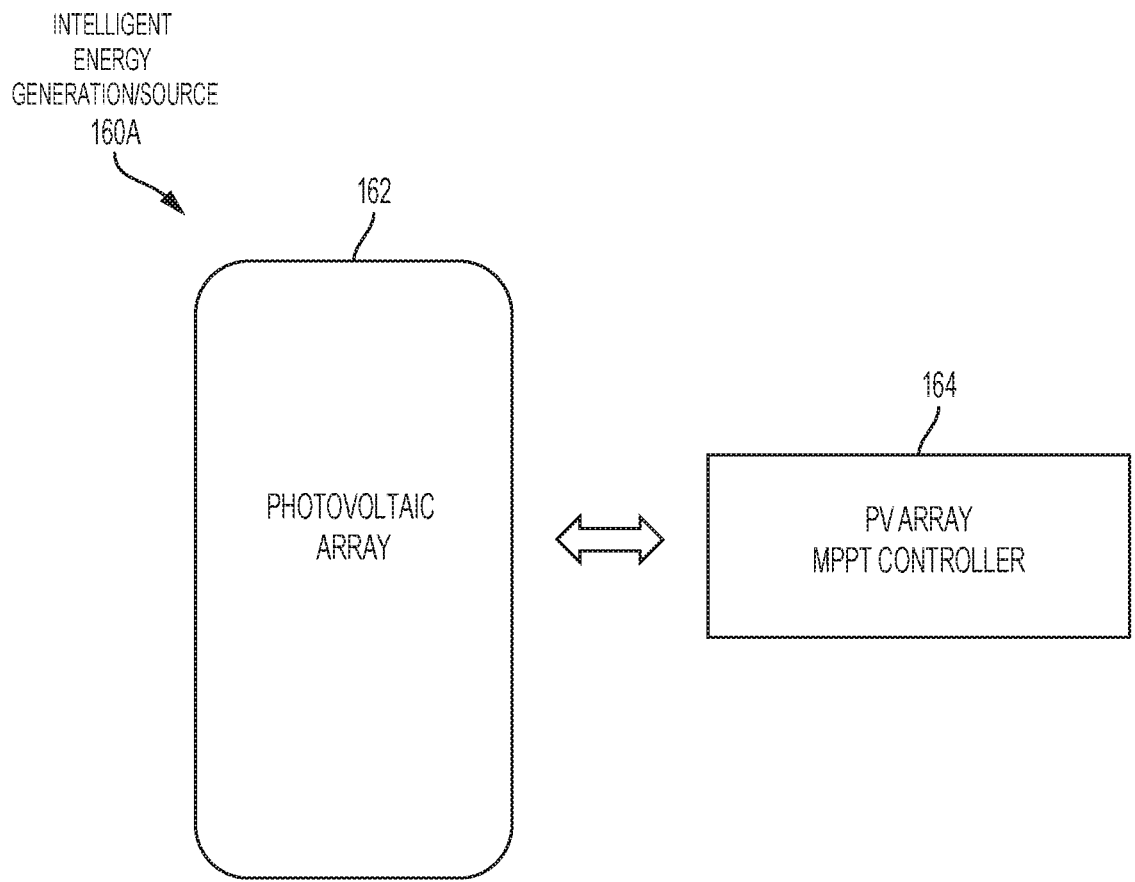
FIG. 5 is a block diagram illustrating an energy generation/source system of the sensor system in accordance with embodiments of the invention.

In embodiments of the invention, the energy signature can be generated by providing the local processor 170 with an energy signature compute task configured to utilize the DVFS functionality of the shared local processor 170 (or the dedicated/distributed local processors 118, 134, 164 shown in FIGS. 2, 4, and 5) to perform DVFS load managing tasks in a manner that generates a recognizable energy (or load) pattern that can be used as the energy signature. Additional details of how the energy signature compute task are described earlier in this detailed description.

In embodiments of the invention in which the authentication is between the generation source 160 (shown in FIG. 1) and the energy storage 130 (shown in FIG. 1), the method used to generate the energy signature can be tailored based at least in part on the type of component used at the generation source 160. For example, in embodiments of the invention, the generation source 160 can be a dispatchable energy generator that dispatches its energy at the request of its load (e.g., the energy storage 130 or the sensor/actuator 110) according to power needs. Thus, dispatchable generators can be turned on or off, or can adjust their power output accordingly in response to commands. In embodiments of the invention, the energy signature is generated by configuring the shared/distributed processor 170 to issue a set of commands to the dispatchable generation source to periodically generate a specific generation pattern that can be recognized by the energy storage 130. In embodiment of the invention where the generation source 160 is a non-dispatchable generation source (such as a solar panel), a specific generation pattern can be generated by adjusting component voltage of the non-dispatchable generation source using the shared/distributed processor 170. In embodiments of the invention, the shared/distributed processor 170 can be configured to provide an authentication schedule in which no energy signature is required during certain predetermined times, for example, overnight when a solar power local generator is not receiving any light.

FIG. 2 is a block diagram illustrating a sensor/actuator 110A, which is an example implementation of the sensor/actuator 110 shown in FIG. 1. The sensor/actuator 110A includes an input transducer 112, an input rectification and conditioning circuit 116, a local processor 118, an output driver 120, a sensor, and an actuator 124, configured and arranged as shown. The input transducer 212 can be implemented as a wireless-to-wired conversion element configured to receive wireless communications. In embodiments of the invention, the input transducer 212 also includes circuitry that allows it to receive wired transmissions, including, for example, wired transmissions from the energy storage 130 (shown in FIG. 1) and/or the generation source 160 (shown in FIG. 1). In embodiments of the invention, the functionality of the input transducer 112 and output transducer 114 can be integrated into a single input/output transducer element (not shown).

The input rectification and conditioning circuit 116 receives input energy from the energy storage 130 (shown in FIG. 1) or the generation source 160 (shown in FIG. 1) and generates usable electric power, which can be provided to the remaining elements of the sensor/actuator 110A. In embodiments of the invention, input rectification and conditioning circuit 116 rectifies an alternating signal from the energy storage 130 or the generation source 160 to produces a direct current source at a desired voltage. Input transducer 112 is operationally connected to local processor 118 either directly or through input rectification and conditioning circuit 116. Local processor 118 receives power through a connection to input rectification and conditioning circuit 116. Local processor 118 controls the sensing and actuating functions of the sensor/actuator 110A, as well as implementing one or more of the functions connected with the tamper mitigation method 600 (shown in FIG. 6). Output driver 210 is operationally connected to input rectification and conditioning circuit 116 to provide a power source to the various components of the sensor/actuator 110A.

Sensor 122 measures parameters that are required for the particular application to which the locally powered smart device 100 (shown in FIG. 1) is deployed, including, for example, temperature, pressure, force, magnetic field, electric field, chemical potential, and the like. Sensor 122 is operationally connected to local processor 118 and can be energized by the energy storage 130 (shown in FIG. 1) through the input rectification and conditioning circuit 116. Similarly, actuator 124 is operationally connected to local processor 118 and sensor 122 and can be energized by the energy storage 130 (shown in FIG. 1) through the input rectification and conditioning circuit 116. Actuator 124 can be configured and arranged to take actions that are required for the particular application to which the locally powered smart device 100 (shown in FIG. 1) is deployed, including, for example, causing an electrical or mechanical action. For example, actuator 124 could be implemented as a valve or a nanoliter dispenser. Actuator 124 could also deliver a therapeutic electrical or mechanical stimulation. Actuator 124 is operationally connected to the local processor 118 and can be energized by the energy storage 130 through the input rectification and conditioning circuit 116. Output signals from the local processor 118 are emitted (wired or wirelessly) by the output transducer 114. Output driver 210 provides amplification, impedance matching and isolation between the local processor 118 and the output transducer 114.

FIG. 4 is a block diagram illustrating an energy storage system 130A, which is an example implementation of the energy storage 130 (shown in FIG. 1). The energy storage system 130A includes a rechargeable battery 132 and a protection & control IC 134, configured and arranged as shown. The protection & control IC 134 includes a control 136 and a switch 138, configured and arranged as shown. A load 140 (e.g., sensor/actuator 110, 110A shown in FIGS. 1 and 2) and the generations source 160 (or 160A shown in FIG. 5) can be communicatively coupled through the protection & control IC 134 to the positive terminal 144 and the ground terminals 148, 146 of the rechargeable battery 132. In embodiments of the invention, the protection & control IC 134 is configured to implement relevant portions of the tamper mitigation method 600 (shown in FIG. 6). Based at least in part on whether the authentication at decision block 604 of the method 600 is successful or fails, the control 136 determines the ON/OFF state of the switch 138 to implement one of the anti-theft methods at block 612 of the method 600. In embodiments of the invention, the switch 138 is coupled in the ground path between the negative, or GND, terminal 148 of the battery 132 and the ground output (GNDOUT) 146. In this configuration, the switch 138 controls current flow through the ground path to selectively engage or disable the battery 132. The control 136 controls the ON/OFF state of the switch 138.

FIG. 5 is a block diagram illustrating an energy generation source 160A, which is an example implementation of the generation source 160 (shown in FIG. 1). The generation source 160A is a photovoltaic (PV) array 162 communicatively coupled to an MPPT controller 164. In embodiments of the invention, the PV array 162 can included PV cells connected electrically in series and/or parallel circuits to produce higher voltages, currents and power levels. In embodiments of the invention, the PV cells of the PV array can be configured and arranged to harvest energy from a variety of light sources, including, for example, indoor lighting. The MPPT controller 164 is configured to automatically vary the load conditions of the PV array 162 so it can produce its maximum output power. This is necessary because a PV cell has non-linear current-voltage qualities. In embodiments of the invention, the MPPT controller 164 is modified to also implement relevant portions of the tamper mitigation method 600 (shown in FIG. 6). Based at least in part on whether the authentication at decision block 604 of the method 600 is successful or fails, the MPPT controller 164 controls the load conditions of the PV array 162 to implement one of the anti-theft methods at block 612 of the method 600.

Figure 7:
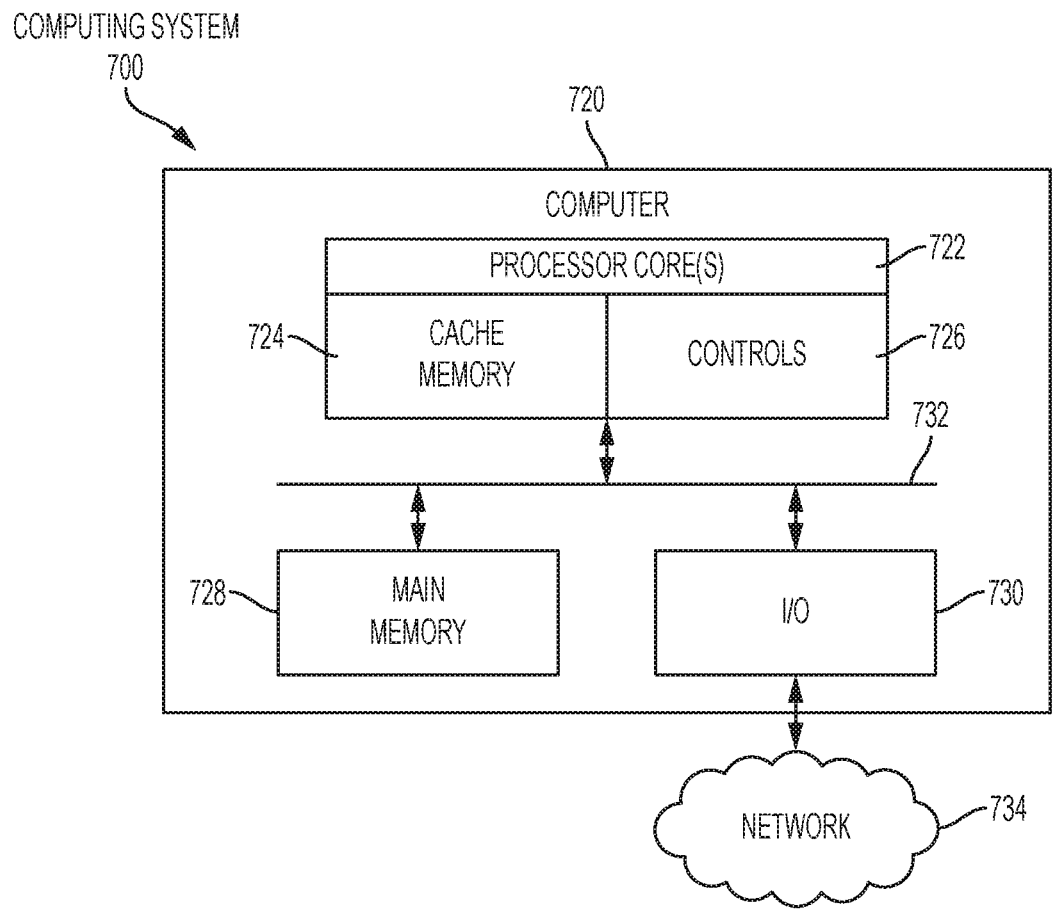
FIG. 7 is a block diagram illustrating a computing system in accordance with embodiments of the invention.

FIG. 7 illustrates a more detailed example of how the shared/distributed processor 170 (shown in FIG. 1), the local processor 118 (shown in FIG. 2), the protection & control IC 134 (shown in FIG. 4), and/or the MPPT controller 164 (shown in FIG. 5) can be implemented as a computer system 700 including an exemplary computing device ("computer") 700 in accordance with aspects of the invention. In addition to computer 720, exemplary computer system 700 includes network 734, which connects computer 720 to additional systems (not depicted) and can include one or more wide area networks (WANs) and/or local area networks (LANs) such as the Internet, intranet(s), and/or wireless communication network(s). Computer 720 and additional systems are in communication via network 734, e.g., to communicate data between them.

Exemplary computer 720 includes processor cores 722, main memory ("memory") 728, and input/output component(s) 730, which are in communication via bus 732. Processor cores 722 includes cache memory ("cache") 724 and controls 726, which include components configured to communicate with and control the intelligent sensor/actuator 110, intelligent storage 130, and intelligent generation source 160 (all shown in FIG. 1), which have been described in detail herein. Cache 724 can include multiple cache levels (not depicted) that are on or off-chip from processor 722. Memory 724 can include various data stored therein, e.g., instructions, software, routines, etc., which, e.g., can be transferred to/from cache 724 by controls 726 for execution by processor 722. Input/output component(s) 730 can include one or more components that facilitate local and/or remote input/output operations to/from computer 720, such as a display, keyboard, modem, network adapter, etc. (not depicted).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A locally-powered smart device comprising:
a sensor;
an energy storage battery communicatively coupled to the sensor; and
a processor communicatively coupled to the sensor and the energy storage battery;
wherein a prerequisite to the sensor receiving energy from the energy storage battery comprises the processor controlling the sensor and the energy storage battery to perform multiple iterations of a first tamper mitigation process, wherein each of the multiple iterations of the first tamper mitigation process comprises a first authentication process comprising the transmission of a first type of authentication communications between the sensor and the energy storage battery; and
wherein the processor is configured to initiate a first anti-tampering protocol based at least in part on a determination, by the processor, that one or more of the multiple iterations of the first tamper mitigation process was unsuccessful.

2. The device of claim 1, wherein the first authentication process comprises a digital signature process.

3. The device of claim 1, wherein the first type of authentication communications comprises an energy signature.

4. The device of claim 3, wherein the energy signature comprises a modulated version of an energy load drawn from the energy storage battery by the sensor according to one or more specific patterns.

5. The device of claim 3, wherein:
the processor comprises a dynamic voltage frequency scaling (DVFS) functionality; and
the DVFS functionality is configured to generate the energy signature by applying dynamic voltage scaling or dynamic frequency scaling to components of the processor while the sensor or the energy storage battery is performing a computational task that draws energy.

6. The device of claim 1 further comprising:
an energy source;
wherein the energy storage battery is communicatively coupled to the energy source and the sensor such that the energy storage battery receives energy from the energy source;
wherein the processor is communicatively coupled to the energy source, the sensor, and the energy storage battery;
wherein a prerequisite to the energy storage battery receiving energy from the energy source comprises the processor controlling the energy source and the energy storage battery to perform multiple iterations of a second tamper mitigation process, wherein each of the multiple iterations of the second tamper mitigation process comprises a second authentication process comprising the transmission of a second type of authentication communications between the energy source and the energy storage battery; and
wherein the processor is further configured to initiate a second anti-tampering protocol based at least in part on a determination, by the processor, that one or more of the multiple iterations of the second tamper mitigation process was unsuccessful.

7. The device of claim 6, wherein:
the first type of authentication communications or the second type of authentication communications comprises an energy signature;
the energy signature comprises a modulated version of an energy load;
the processor comprises a dynamic voltage frequency scaling (DVFS) functionality; and
the DVFS functionality is configured to generate the energy signature by applying dynamic voltage scaling or dynamic frequency scaling to components of the processor while the sensor, the energy storage battery, or the energy source is performing a computational task that draws energy.

8. A computer-implemented method of operating a locally-powered smart device, the computer-implemented method comprising:
controlling, using a processor, a sensor of the smart device and an energy storage battery of the smart device to perform multiple iterations of a first tamper mitigation process;
wherein a prerequisite to the sensor receiving energy from the energy storage battery comprises the processor controlling the sensor and the energy storage battery to perform the multiple iterations of the first tamper mitigation process, wherein each of the multiple iterations of the first tamper mitigation process comprises a first authentication process comprising the transmission of a first type of authentication communications between the sensor and the energy storage battery;
wherein the processor is configured to allow the sensor to receive energy from the energy storage battery based at least in part on a determination, by the processor, that the first type of the authentication process was successful; and
initiating, using the processor, an anti-tampering protocol based at least in part on a determination, by the processor, that one or more of the multiple iterations of the first tamper mitigation process was unsuccessful.

9. The computer-implemented method of claim 8, wherein the first authentication process comprises a digital signature process.

10. The computer-implemented method of claim 8, wherein the first type of authentication communications comprises an energy signature.

11. The computer-implemented method of claim 10, wherein the energy signature comprises
a modulated version of an energy load drawn from the energy storage battery by the sensor according to one or more specific patterns.

12. The computer-implemented method of claim 10, wherein:
the processor comprises a dynamic voltage frequency scaling (DVFS) functionality; and
the DVFS functionality is configured to generate the energy signature by applying dynamic voltage scaling or dynamic frequency scaling to components of the processor while the sensor or the energy storage battery is performing a computational task that draws energy.

13. The computer-implemented method of claim 8 further comprising:
controlling, using the processor, an energy source of the smart device and the energy storage battery of the smart device to perform multiple iterations of a second tamper mitigation process;
wherein the energy storage battery is communicatively coupled to the energy source such that the energy storage battery receives energy from the energy source;
wherein a prerequisite to the energy storage battery receiving energy from the energy source comprises the processor controlling the energy source and the energy storage battery to perform the multiple iterations of the second tamper mitigation process, wherein each of the multiple iterations of the second tamper mitigation process comprises a second type of an authentication process comprising the transmission of authentication communications between the energy source and the energy storage battery;
wherein the processor is configured to allow the energy storage battery to receive energy from the energy source based at least in part on a determination, by the processor, that the second type of the authentication process was successful; and
initiating, using the processor, an anti-tampering protocol based at least in part on a determination, by the processor, that one or more of the multiple iterations of the second tamper mitigation process was unsuccessful.

14. The computer-implemented method of claim 13, wherein:
- the first type of authentication communications or the second type of authentication communications comprises an energy signature;
- the energy signature comprises a modulated version of an energy load;
- the processor comprises a dynamic voltage frequency scaling (DVFS) functionality; and
- the DVFS functionality is configured to generate the energy signature by applying dynamic voltage scaling or dynamic frequency scaling to components of the processor while the sensor, the energy storage battery, or the energy source is performing a computational task that draws energy.

15. A computer program product for operating a locally-powered smart device, the computer program product comprising a computer readable storage medium having program code embodied therewith, wherein the program code is executable by a processor to implement operations comprising:
- controlling a sensor of the smart device and an energy storage battery of the smart device to perform multiple iterations of a first tamper mitigation process;
- wherein a prerequisite to the sensor receiving energy from the energy storage battery comprises the processor controlling the sensor and the energy storage battery to perform the multiple iterations of the first tamper mitigation process, wherein each of the multiple iterations of the first tamper mitigation process comprises a first authentication process comprising the transmission of a first type of authentication communications between the sensor and the energy storage battery;
- wherein the processor is configured to allow the sensor to receive energy from the energy storage battery based at least in part on a determination, by the processor, that the authentication process was successful; and
- initiating an anti-tampering protocol based at least in part on a determination that one or more of the multiple iterations of the first tamper mitigation process.

16. The computer program product of claim 15, wherein the first authentication process comprises a digital signature process.

17. The computer program product of claim 16, wherein the first type of authentication communications comprises an energy signature.

18. The computer program product of claim 17, wherein the energy signature comprises
a modulated version of an energy load drawn from the energy storage battery by the sensor according to one or more specific patterns.

19. The computer program product of claim 17, wherein:
- the processor comprises a dynamic voltage frequency scaling (DVFS) functionality; and
- the DVFS functionality is configured to generate the energy signature by applying dynamic voltage scaling or dynamic frequency scaling to components of the processor while the sensor or the energy storage battery is performing a computational task that draws energy.

20. The computer program product of claim 15, wherein the operations performed by the processor further comprise:
- controlling an energy source of the smart device and the energy storage battery of the smart device to perform multiple iterations of a second tamper mitigation process;
- wherein the energy storage battery is communicatively coupled to the energy source such that the energy storage battery receives energy from the energy source;
- wherein a prerequisite to the energy storage battery receiving energy from the energy source comprises the processor controlling the energy source and the energy storage battery to perform the multiple iterations of the second tamper mitigation process, wherein each of the multiple iterations of the second tamper mitigation process comprises a second type of an authentication process comprising the transmission of authentication communications between the energy source and the energy storage battery;
- wherein the processor is configured to allow the energy storage battery to receive energy from the energy source based at least in part on a determination, by the processor, that the second type of the authentication process was successful; and
- initiating, using the processor, an anti-tampering protocol based at least in part on a determination, by the processor, that one or more of the multiple iterations of the second tamper mitigation process was unsuccessful.

21. The computer program product of claim 20, wherein:
- the first type of authentication communications or the second type of authentication communications comprises an energy signature;
- the energy signature comprises a modulated version of an energy load;
- the processor comprises a dynamic voltage frequency scaling (DVFS) functionality; and
- the DVFS functionality is configured to generate the energy signature by applying dynamic voltage scaling or dynamic frequency scaling to components of the processor while the sensor, the energy storage battery, or the energy source is performing a computational task that draws energy.

* * * * *